(12) United States Patent
Jia (10) Patent No.: US 12,023,975 B2
(45) Date of Patent: Jul. 2, 2024

(54) STRUT ASSEMBLY AND VEHICLE APPLYING SAME

(71) Applicants: Zhejiang Geely Holding Group Co., Ltd., Hangzhou (CN); Zhejiang Liankong Technologies Co., Ltd., Ningbo (CN)

(72) Inventor: Weizhen Jia, Ningbo (CN)

(73) Assignees: Zhejiang Geely Holding Group Co., Ltd., Hangzhou (CN); Zhejiang Liankong Technologies Co., Ltd., Ningbo (CN)

( * ) Notice: Subject to any disclaimer, the term of this patent is extended or adjusted under 35 U.S.C. 154(b) by 0 days.

(21) Appl. No.: 17/912,060

(22) PCT Filed: Mar. 18, 2020

(86) PCT No.: PCT/CN2020/080021
§ 371 (c)(1),
(2) Date: Sep. 16, 2022

(87) PCT Pub. No.: WO2021/184258
PCT Pub. Date: Sep. 23, 2021

(65) Prior Publication Data
US 2023/0122959 A1     Apr. 20, 2023

(51) Int. Cl.
*B60G 15/06*     (2006.01)
*F16F 13/00*     (2006.01)

(52) U.S. Cl.
CPC ......... *B60G 15/068* (2013.01); *B60G 15/062* (2013.01); *F16F 13/007* (2013.01);
(Continued)

(58) Field of Classification Search
CPC .... B60G 13/06; B60G 15/062; B60G 15/067; B60G 15/068; B60G 15/07;
(Continued)

(56) References Cited

U.S. PATENT DOCUMENTS

2004/0245691 A1    12/2004  Handke
2009/0145707 A1     6/2009  Henneberg
(Continued)

FOREIGN PATENT DOCUMENTS

CN     104019172 A    9/2014
CN     205022321 U    2/2016
(Continued)

OTHER PUBLICATIONS

Description Translation for CN 206201892U from Espacenet (Year: 2017).*

(Continued)

*Primary Examiner* — Jason D Shanske
*Assistant Examiner* — Daniel M. Keck
(74) *Attorney, Agent, or Firm* — Andrew C. Cheng (57) ABSTRACT

A strut assembly includes a piston rod of a shock absorber, an upper support of the shock absorber, a bearing, a spring and a buffer block, which are coaxially arranged. The upper support of the shock absorber has a first through hole, the bearing has a second through hole, and a portion of the upper support of the shock absorber is arranged in the second through hole, the buffer block has a third through hole, and one end of the piston rod of the shock absorber is located in the first through hole, the other end of the piston rod of the shock absorber passes through the third through hole, the buffer block is connected with the upper support of the shock absorber, the spring is sleeved around the piston rod of the shock absorber, and the spring is connected with the bearing. The present disclosure further provides a vehicle.

16 Claims, 8 Drawing Sheets

(52) U.S. Cl.
CPC .. *B60G 2202/312* (2013.01); *B60G 2204/128* (2013.01); *B60G 2204/41* (2013.01); *B60G 2204/418* (2013.01); *B60G 2800/162* (2013.01)

(58) Field of Classification Search
CPC ........ B60G 2202/312; B60G 2204/128; B60G 2204/41; B60G 2204/418; B60G 2204/45021; B60G 2800/162; B60Y 2400/86; F16F 9/54; F16F 13/007; F16F 2230/28
See application file for complete search history.

(56) References Cited

U.S. PATENT DOCUMENTS

| | | | |
|---|---|---|---|
| 2014/0239567 A1* | 8/2014 | Suchta | F16F 9/585 267/220 |
| 2016/0221409 A1* | 8/2016 | Jang | F16C 35/067 |

FOREIGN PATENT DOCUMENTS

| | | | | |
|---|---|---|---|---|
| CN | 206201892 | U | * | 5/2017 |
| CN | 206201892 | U | | 5/2017 |
| DE | 102007024582 | A1 | | 11/2008 |
| EP | 1072450 | A2 | | 1/2001 |
| EP | 1072450 | A3 | | 11/2001 |
| FR | 2859513 | A1 | * | 3/2005 ............. B60G 13/00 |
| FR | 3117991 | A1 | * | 6/2022 |
| JP | 2001065626 | A | | 3/2001 |
| JP | 2007100889 | A | | 4/2007 |
| KR | 1020090006697 | A | | 1/2009 |

OTHER PUBLICATIONS

The extend European search report of EP application 20925496.0 dated Oct. 17, 2023.
The office action of JP application No. 2022-554636 dated Sep. 26, 2023.

* cited by examiner

STRUT ASSEMBLY AND VEHICLE APPLYING SAME

CROSS REFERENCE TO RELATED APPLICATIONS

The present disclosure is a 35 U.S.C. § 371 National Phase conversion of International (PCT) Patent Application No. PCT/CN2020/080021, filed on Mar. 18, 2020. The entire contents of the above-identified applications are incorporated herein by reference. The PCT International Patent Application was filed and published in Chinese.

TECHNICAL FIELD

The present disclosure relates to the technical field of automobile parts manufacturing, in particular to a strut assembly and a vehicle applying the same.

BACKGROUND

The strut assembly is a general term for all force-transmitting connection devices between the frame (or body) and the axle (or wheels) of the vehicle. Its function is to transmit the force and torsion acting between the wheel and the frame, buffer the impact force transmitted to the frame (or body) from the uneven road, reduce the caused vibration to ensure the ride comfort of the vehicle. Generally, the strut assembly is mainly composed of elastic elements, shock absorbers, bearings, upper supports and other components, and some strut assembly further include buffer blocks, lateral stabilizer bars, and the like. The elastic elements include leaf springs, air springs, coil springs and torsion bar springs. The shock absorber is the main component that generates damping force. Its function is to quickly attenuate the vibration of the vehicle, improve the ride comfort of the vehicle, and enhance the adhesion between the wheels and the ground. Moreover, the shock absorber is able to reduce the dynamic load of the vehicle body and prolong the service life of the vehicle. The upper support is used to support and fix the elastic element while providing a mounting structure to the frame (or body). The bearing is arranged between the upper support and the shock absorber.

In the prior art, the front strut assembly mainly transmits the impact load of the road surface to the vehicle body in two ways: single-channel transmission and dual-channel transmission. Specifically, single-channel transmission means that the damping force generated by the shock absorber is sequentially transmitted to the vehicle body through the bearing and the upper support. Dual-channel transmission means that except that the damping force of the shock absorber is transmitted to the vehicle body through the bearing and the upper support, the resultant force exerted on the elastic element and the buffer block is transmitted to the vehicle body through the bearing, and forming a dual-channel transmission path. According to the single-channel transmission method, the bearing and the upper support are easy to damage due to the large load being exerted thereon, which results their service life being short. Furthermore, the single-channel transmission method cannot buffer the force on the elastic element, and the friction loss of the shock absorber caused by the lateral force of the elastic element cannot be solved, either. The double-channel transmission method has the disadvantage of high bearing load, which is easy to cause bearing wear and even breakage, which seriously reduces the service life of the bearing. If high-performance materials are used to make a bearing, the cost will increase. In addition, in the prior art, the elastic mechanism and the bearing are in partial contact, which causes the bearing to be easily subjected to uneven force, which not only causes the bearing life to be attenuated, but also tends to produce abnormal noise due to friction between the elastic mechanism and the bearing, which reduces the user's driving experience.

In view of the above-mentioned defects in the prior art, the present disclosure aims to provide a strut assembly and a vehicle applying the same.

SUMMARY

In view of the above problems of the prior art, the purpose of the present disclosure is to provide a strut assembly and a vehicle applying the same.

In order to solve the above problems, the present disclosure provides a strut assembly, including a piston rod of a shock absorber, an upper support of the shock absorber, a bearing, a spring and a buffer block. The piston rod of the shock absorber, the upper support of the shock absorber, the bearing and the buffer block are coaxially arranged.

The upper support of the shock absorber is provided with a first through hole, the bearing is provided with a second through hole, a portion of the upper support of the shock absorber is arranged in the second through hole, and the buffer block is provided with a third through hole. One end of the piston rod of the shock absorber is located in the first through hole, the other end of the piston rod of the shock absorber passes through the third through hole, and the buffer block is connected to the upper support of the shock absorber. The spring is sleeved around the piston rod of the shock absorber, and the spring is connected with the bearing.

Specifically, the upper support of the shock absorber includes an upper cover, a first recess portion and a second recess portion that are connected in sequence. The first through hole penetrates through the upper cover, the first recess portion and the second recess portion. The buffer block is connected with the second recess portion, the upper cover is blocked outside the second through hole, the first recess portion is located in the second through hole, and the second recess portion can partially protrude out of the second through hole.

Specifically, the second recess portion is provided with a clamping portion, the buffer block is provided with a groove, and the clamping portion is clasped in the groove so that the upper support of the shock absorber is connected with the buffer block.

Furthermore, a shock-absorbing rubber and a connecting piece are provided between the first recess portion and the upper cover. The connecting piece is arranged on the outer circumference of the piston rod of the shock absorber, and the connecting piece is located between an upper portion and a lower portion of the shock-absorbing rubber.

Preferably, the upper cover is provided with a plurality of first bosses, and the first bosses are provided with a plurality of mounting holes.

Furthermore, a first buffer device is provided between the bearing and the spring, and the first buffer device is coaxially arranged with the bearing.

Specifically, a side of the bearing away from the first buffer device is provided with a second boss, and the bearing is connected to the first recess portion of the upper support of the shock absorber through the second boss.

Furthermore, the height of the lowest portion of the upper support of the shock absorber is lower than the height of the lowest portion of the bearing, and an outer diameter of the lowest portion of the upper support of the shock absorber is smaller than an outer diameter of the lowest portion of the bearing.

Preferably, the spring is a coil spring, and the side of the spring close to the bearing is provided with a horizontal portion. Another aspect of the present disclosure provides a vehicle, which includes a vehicle body, a wheel hub and the strut assembly described in the above technical features.

The strut assembly is connected to the vehicle body through the first boss of the upper support of the shock absorber, and the strut assembly is connected to the wheel hub through the piston rod of the shock absorber.

Due to the above-mentioned technical features, the present disclosure has the following beneficial effects:

1) In the strut assembly of the present disclosure, the force exerted on the shock absorber, the spring and the buffer block can reach the vehicle body through three different transmission paths, thereby reducing the bearing load and preventing the bearing from being broken due to excessive load.

2) In the present disclosure, since the bearing load is small, the bearing does not need to be made of high-performance materials, which is beneficial to reduce costs.

3) In the strut assembly of the present disclosure, there is a height difference H between the bearing and the upper support of the shock absorber, so that the housing of the shock absorber will not touch the bearing at its extreme position of the upward movement. Therefore, the bearing will not be damaged under strong impact, and the protection of the bearing is realized.

4) There is a radial width difference L between the lowest portion of the bearing and the lowest portion of the upper support of the shock absorber. Therefore, when the buffer block is compressed to its limit position with the rotation of the piston rod of the shock absorber, the buffer block also does not hit the bearing and damage it.

5) In the strut assembly of the present disclosure, a first boss is provided at a contact between the upper support of the shock absorber and the vehicle body, and the first boss forms a small surface contact with the vehicle body, which can avoid abnormal noise caused by the collision between the upper support of the shock absorber and the vehicle body; and the first boss can be formed by stamping, which makes the cost of the first boss be low.

6) A first buffer device is provided between the bearing and the spring. The first buffer device can protect the hearing, improve the service life of the bearing, and avoid abnormal noise caused by the collision between the bearing and the spring.

7) In the strut assembly of the present disclosure, the bearing is provided with a second boss, and the bearing forms a small surface contact with the upper bracket of the shock absorber through the second boss, which is beneficial to reduce or avoid abnormal noise caused by the collision between the bearing and the upper bracket of the shock absorber.

8) The first boss reduces the distance H1 from a rotation center A to a top surface of the buffer block. Therefore, the swing range of the piston rod of the shock absorber around the rotation center A is reduced, and the amount of interference between the piston rod of the shock absorber and the buffer block is reduced, and the abnormal noise is reduced while the hard damage to the buffer block is reduced.

9) In the present disclosure, the load of the spring can be evenly distributed on the bearing, and the bearing will not be broken due to uneven force.

BRIEF DESCRIPTION OF THE DRAWINGS

In order to illustrate the technical solutions of the present disclosure more clearly, the following will briefly introduce the accompanying drawings that are required to be used in the description of the embodiments or the prior art. Obviously, the drawings in the following description are only some embodiments of the present disclosure, and for those of ordinary skill in the art, other drawings can also be obtained from these drawings without creative work.

In the figure: 10-upper support of the shock absorber, 11-first through hole, 12-upper cover, 121-first boss, 13-first recess portion. 131-shock-absorbing rubber, 132-flange, 133-vertical portion, 134-connecting piece, 14-second recess portion, 141-clamping portion, 20-bearing, 21-second through hole, 22-first part, 221-second boss, 2211-first convex ring, 2212-second convex ring, 2213-reinforcing vertical rib, 2214-second convex rib, 23-second part, 24-third part, 241-barb hook, 242-horizontal hook, 30-first buffer device, 31-support frame, 311-bent portion, 32-first convex rib, 40-spring, 50-buffer block, 51-third through hole, 52-groove, 60-dust cover, 70-shock absorber, 71-piston rod of the shock absorber, 711-first rod portion, 722-second rod portion, 72-housing, 80-second buffer device, 90-vehicle body;

I-first channel, II-second channel, III-third channel;

A-rotation center of the piston rod of the shock absorber;

h-the height of the buffer block;

H-the height difference between the lowest portion of the bearing and the lowest portion of the upper support of the shock absorber;

H1-the distance between the rotation center and the highest point of the buffer block;

L-the radial width difference between the lowest portion of the bearing and the lowest portion of the bearing on the shock absorber.

DETAILED DESCRIPTION OF PREFERRED EMBODIMENTS

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments of the present disclosure, all other embodiments obtained by those of ordinary skill in the art without creative work fall within the protection scope of the present disclosure.

It should be noted that the terms "first", "second" and the like in the description, claims and drawings of the present disclosure are used to distinguish similar objects, and are not necessarily used to describe a relative importance or specific sequence. It is to be understood that the data so used may be interchanged under appropriate circumstances such that the embodiments of the invention described herein can be practiced in sequences other than those illustrated or described herein. In addition, the terms of direction or positional relationship indicated by the terms "middle", "upper", "lower", "inner", "outer" and the like are based on the directional or positional relationship shown in the drawings, which is only for convenience of description, rather than indicating or implying that the device or element must have a particular orientation, or be constructed and operate in a particular orientation, and therefore should not be understood as a limitation of the present disclosure. The terms "comprising" and "having", and any variations thereof, are intended to cover non-exclusive inclusion.

Embodiment 1

Referring to FIGS. 1 to 11, an embodiment of the present disclosure provides a strut assembly, which includes a shock absorber 70, an upper support 10 of the shock absorber, a bearing 20, a spring 10 and a buffer block 50. The shock absorber 70, the upper support 10 of the shock absorber, the bearing 20, the spring 10 and the buffer block 50 are coaxially arranged.

Figure 4:
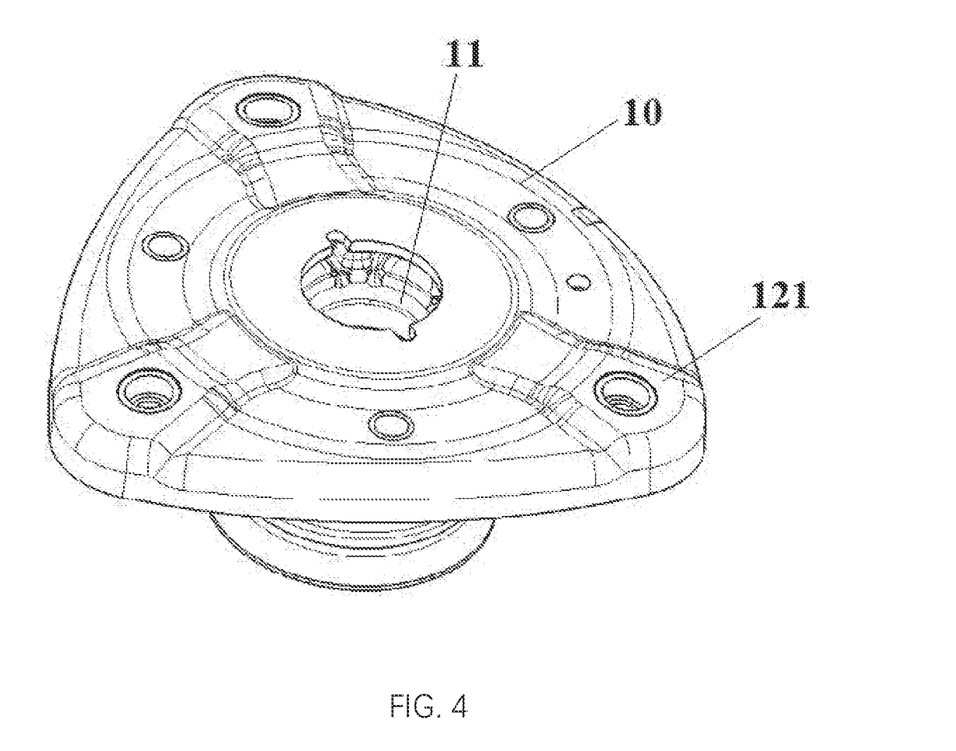
FIG. 4 is a schematic structural view of the upper support of the shock absorber.
Figure 6:
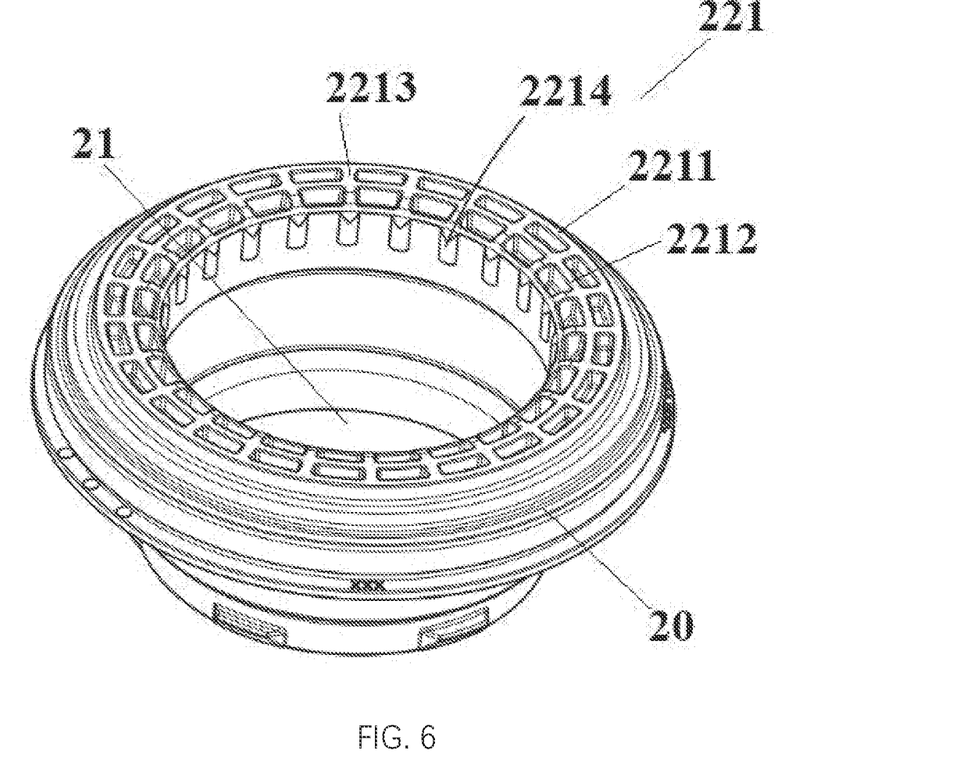
FIG. 6 is a schematic structural view of the bearing.
Figure 10:
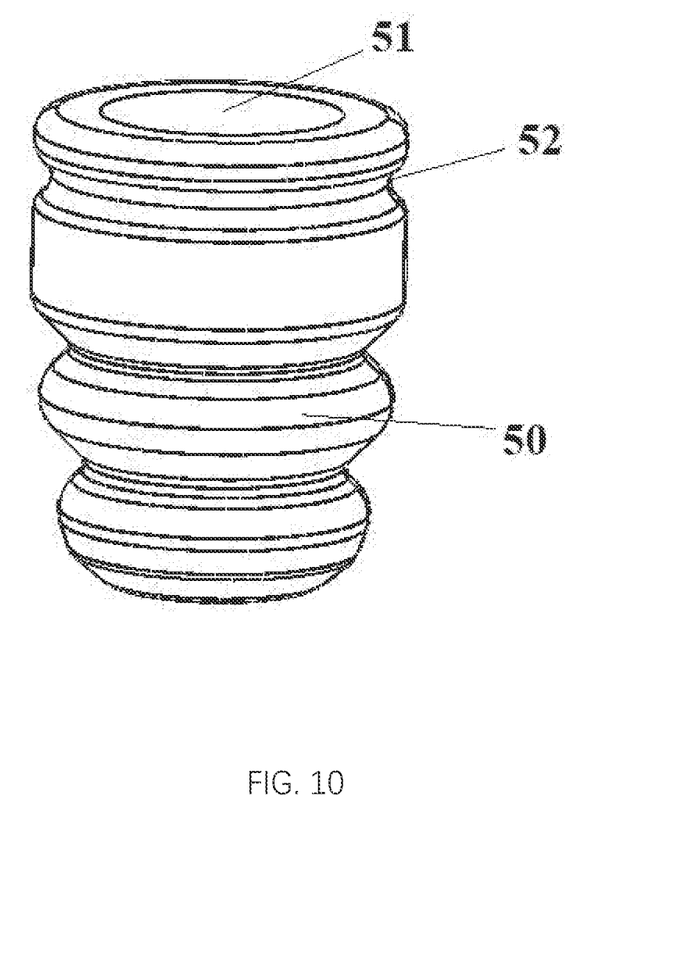
FIG. 10 is a schematic structural view of the buffer block.

The shock absorber 70 includes a piston rod 71, the piston rod 71 of the shock absorber is coaxially arranged with the upper support 10 of the shock absorber, and the upper support 10 of the shock absorber is provided with a first through hole 11 (as shown in FIG. 4), the bearing 20 is provided with a second through hole 21 (as shown in FIG. 6), and a portion of the upper support 10 of the shock absorber is arranged in the second through hole 21. The buffer block 50 is provided with a third through hole 51 (as shown in FIG. 10), one end of the piston rod 71 of the shock absorber is located in the first through hole 11, and the other end of the piston rod 71 of the shock absorber passes through the third through hole 51.

The buffer block 50 is connected with the upper support 10 of the shock absorber, the spring 40 is sleeved outside the piston rod 71 of the shock absorber, and the spring 40 is connected with the bearing 20.

Figure 5:
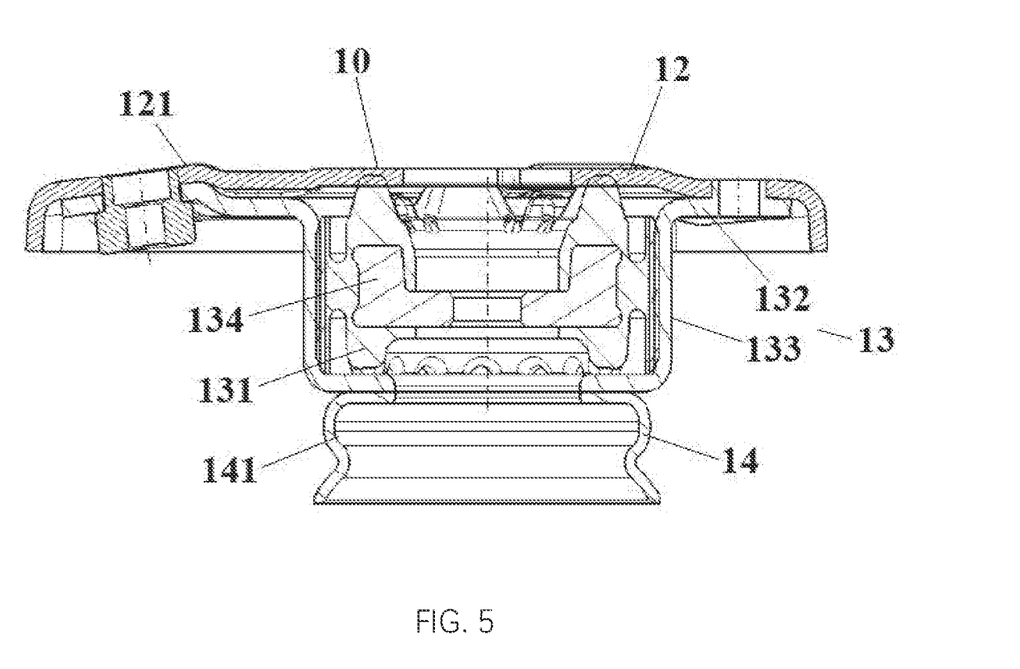
FIG. 5 is a cross-sectional view of the upper support of the shock absorber.

As shown in FIGS. 4 and 5, in the embodiment of the present disclosure, the upper support 10 of the shock absorber includes an upper cover 12, a first recess portion 13 with an upward opening and a second recess portion 14 with a downward opening. The upper cover 12, the first recess portion 13 and the second recess portion 14 are connected in sequence, the first through hole 11 penetrates through the upper cover 12, the first recess portion 13 and the second recess portion 14, and the buffer block 50 is connected with the second recess portion 14.

An outer diameter of the upper cover 12 is larger than a diameter of the second through hole 21. An outer diameter of the first recess portion 13 and an outer diameter of the second recess portion 14 are smaller than a diameter of the second through hole 21 of the bearing 20, so that the first recess portion 13 is arranged in the second through hole 21 of the bearing 20, the second recess portion 14 can partially protrude out from the second through hole 21, and the upper cover 12 is blocked outside the second through hole 21.

A bottom of the first recess portion 13 is fixedly connected with a top of the second recess portion 14 (as shown in FIG. 5). The bottom of the first recess portion 13 is provided with a first opening, and the top of the second recess portion 14 is provided with a second opening. The first opening is matched with the second opening and both are larger than the size of the piston rod 71 of the shock absorber, so that the piston rod 71 of the shock absorber can pass therethrough.

The first recess portion 13 is further provided with a flange 132, the flange 132 is used for fixed connection with the upper cover 12, the size of the flange 132 is smaller than the size of the upper cover 12. A vertical portion 133 is located between the flange 132 and the bottom of the first recess portion 13.

The second recess portion 14 is provided with a clamping portion 141, the buffer block 50 is provided with a groove 52, and the clamping portion 141 cooperates with the groove 52 so that the upper support 10 of the shock absorber and the buffer block 50 is connected.

Figure 1:
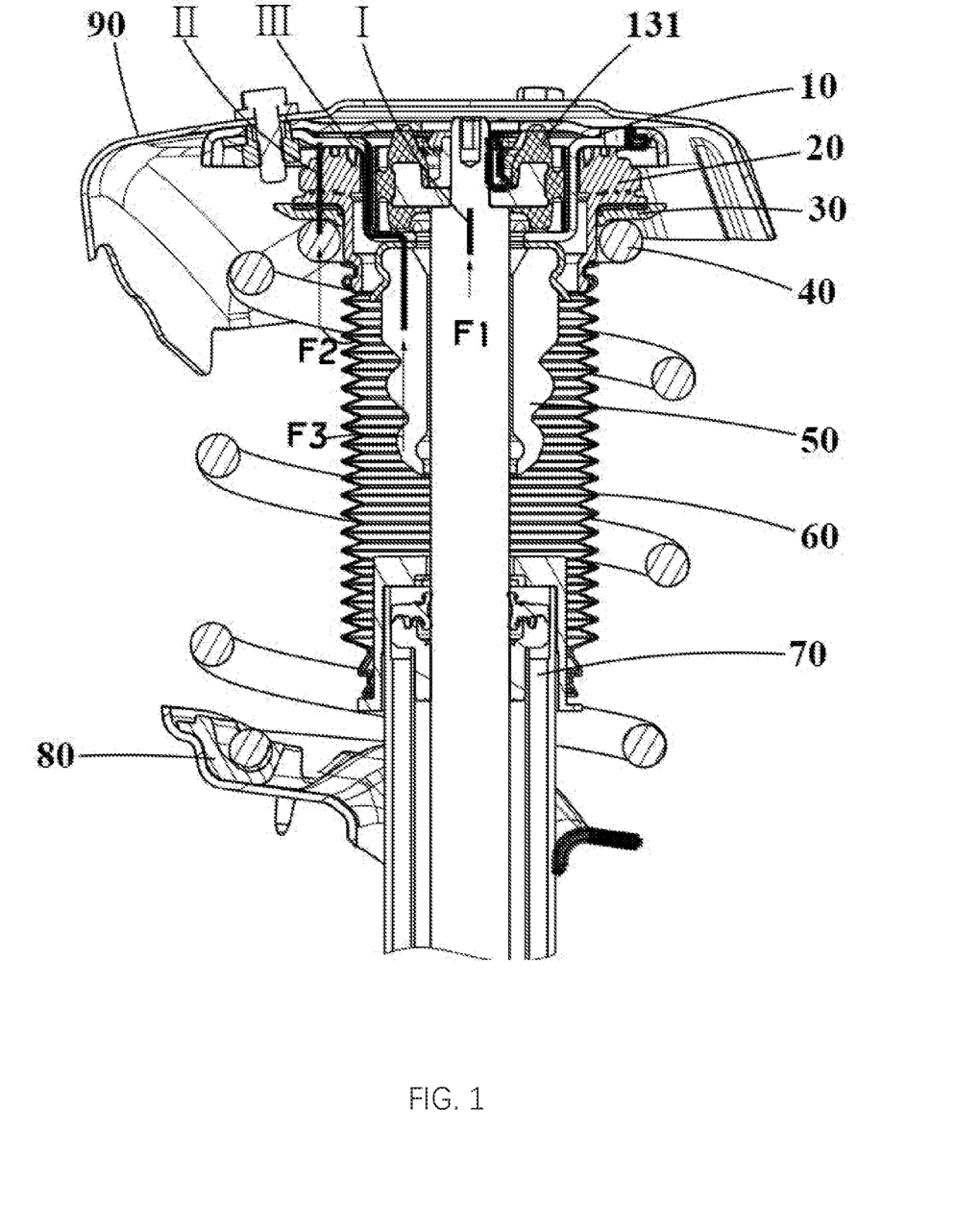
FIG. 1 is a schematic structural view of a strut assembly provided by an embodiment of the present disclosure.
Figure 2:
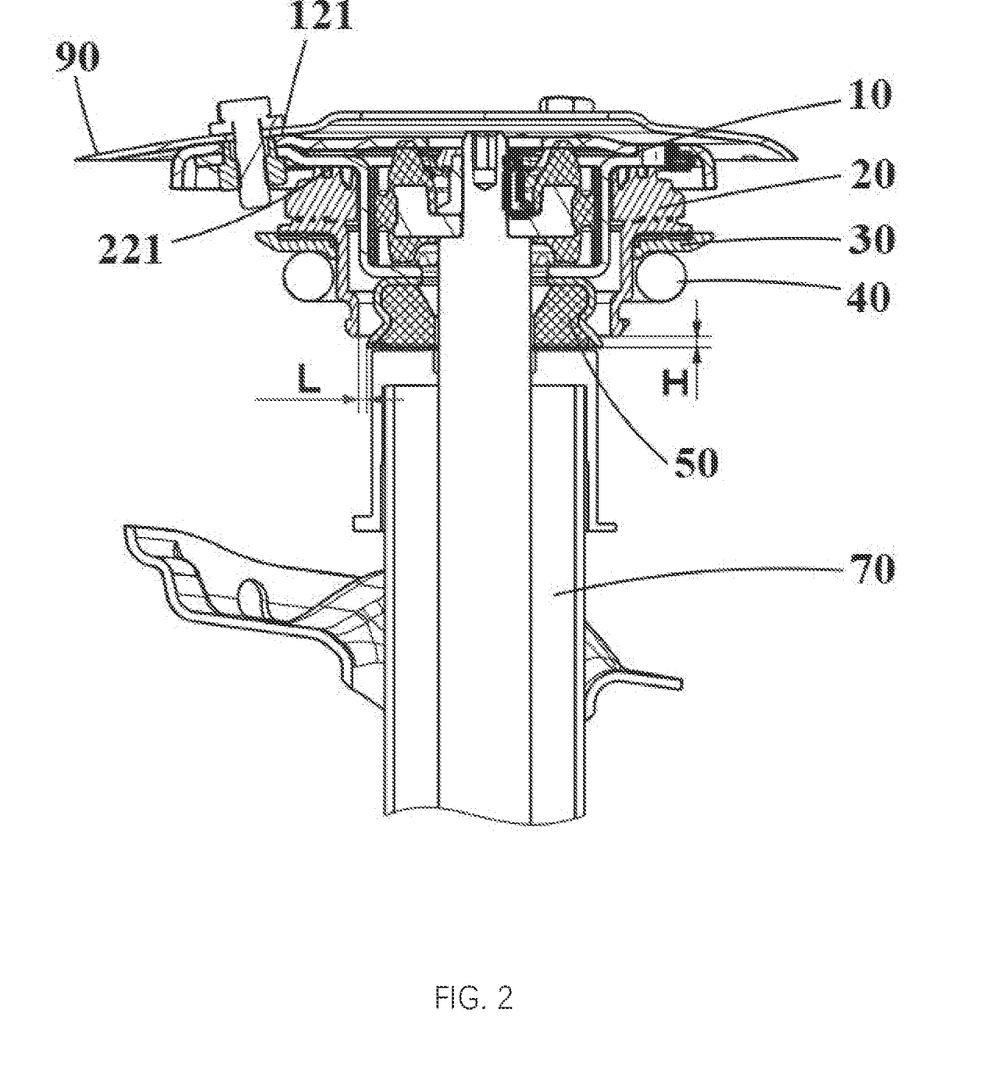
FIG. 2 is a schematic structural view of the strut assembly when the shock absorber is in a rising compression state.
Figure 3:
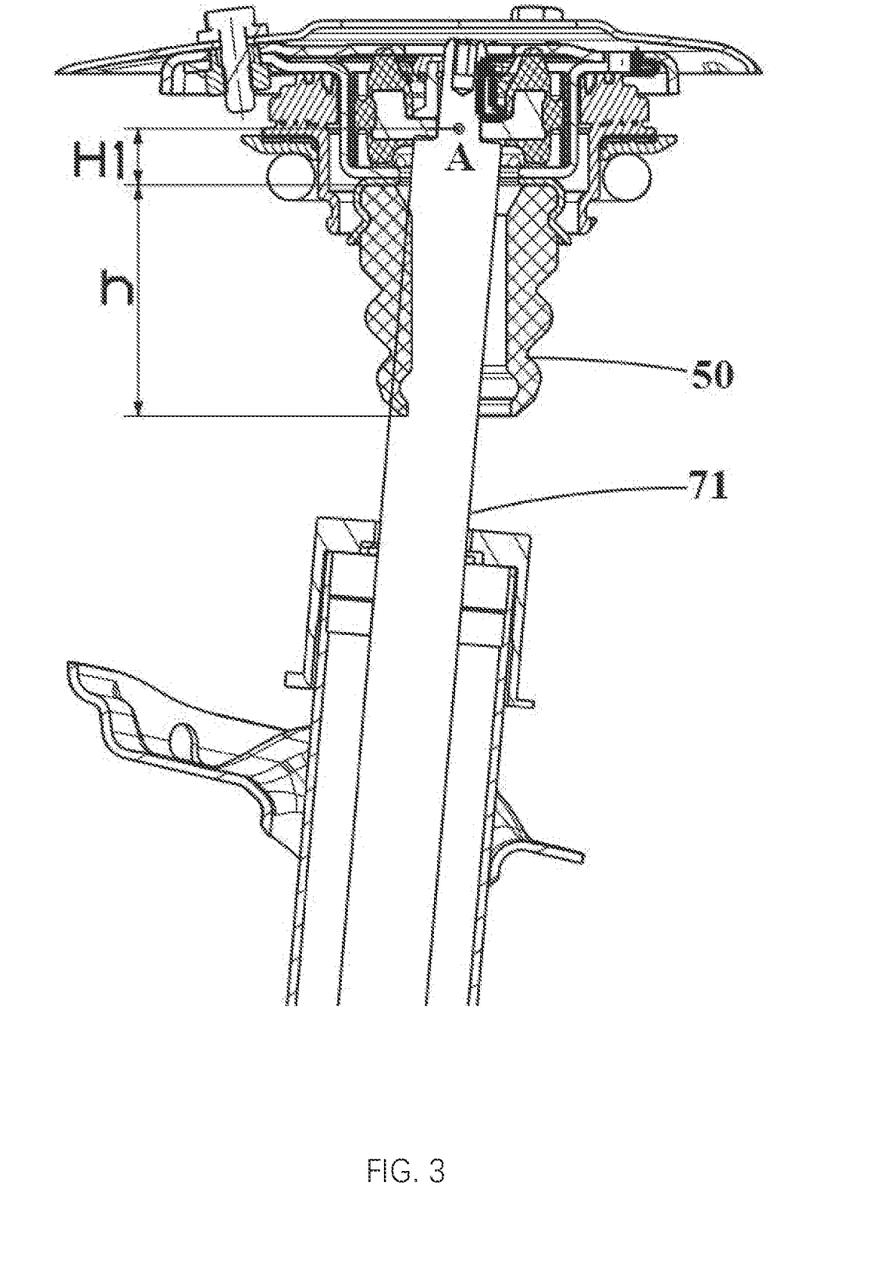
FIG. 3 is a schematic structural view of the strut assembly when the shock absorber is in an inclined compression state.

As shown in FIGS. 1 to 3, the size of the second recess portion 14 is larger than that of an end portion of the buffer block 50, so that the end portion of the buffer block 50 is accommodated in the second recess portion 14. Therefore, a force F3 exerted on the buffer block 50 reaches the vehicle body 90 sequentially through the second recess portion 13, the vertical portion 133 and the upper cover 12, that is, the transmission path of the force F3 exerted on the buffer block 50 does not pass through the bearing 20. The transmission path of force F3 is shown as the third channel III in FIG. 1.

The upper cover 12 is provided with a plurality of first bosses 121, and the first bosses 121 are provided with a plurality of mounting holes. As shown in FIG. 4, the first bosses 121 are provided with three, and the three first bosses 121 are evenly distributed on a surface of the upper cover 12. Of course, the first bosses 121 may also be provided in other numbers.

It should be noted that since the upper cover 12 is provided with the first boss 121, an upper surface of the upper cover 12 is not a horizontal plane, when the upper support 10 of the shock absorber is installed on the vehicle body 90, the first boss 121 contacts with the vehicle body in a small surface, which can avoid abnormal noise caused by collision between the upper support of the shock absorber and the vehicle body. Furthermore, the first boss 121 can be formed by stamping, which results low cost as compared with a method of arranging a vulcanized rubber layer for the contact between the upper support of the shock absorber and the vehicle body.

It should be noted that, in the embodiment of the present disclosure, the flange 132 is also provided with an opening at a position corresponding to the mounting hole, so that the struct assembly provided in the embodiment of the present disclosure is assembled to the vehicle body (or frame) by fasteners (such as screws, etc.), the fasteners pass through the mounting hole of the upper cover 12 and the opening at the flange 132, which not only facilitates the realization of the fixed connection between the upper support 10 of the shock absorber and the vehicle body, and also beneficial to ensure the structural stability of the upper support 10 of the shock absorber.

The first recess portion 13 is connected with the upper cover 12 to form a cavity, the cavity is provided with a damping rubber 131 and a connecting piece 134, and one end of the piston rod 71 of the shock absorber passes through the damping rubber 131 and the connecting piece 134.

Figure 11:
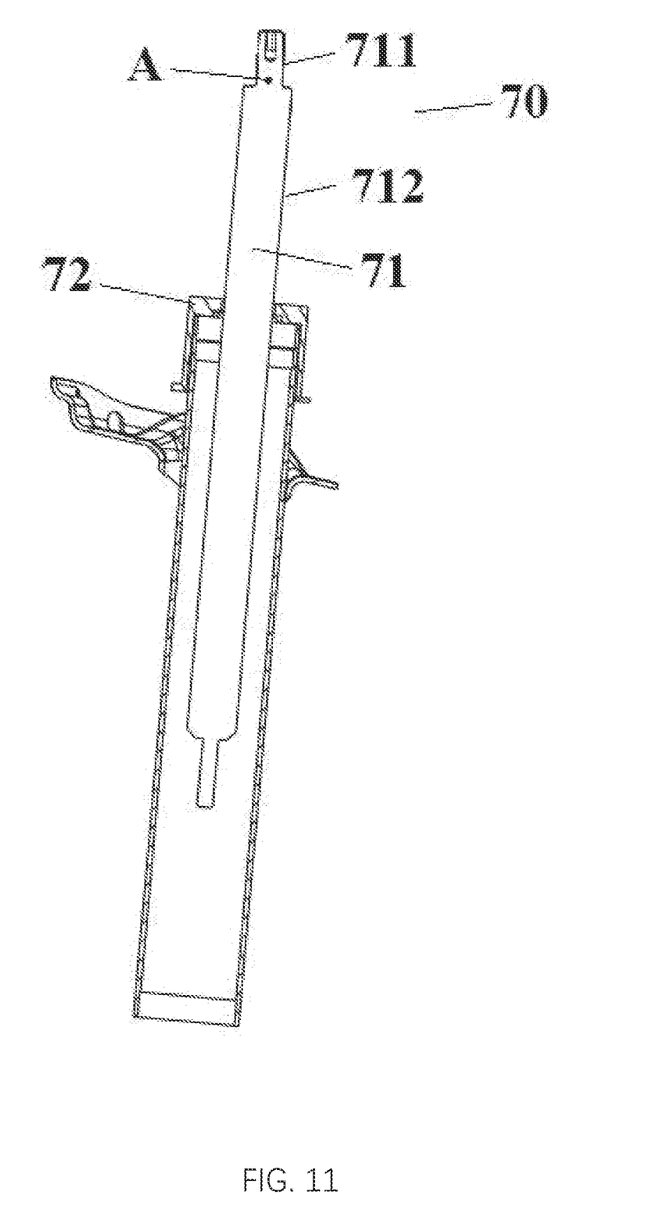
FIG. 11 is a schematic structural view of the shock absorber.

FIG. 11 is a schematic structural view of the shock absorber 70, the shock absorber 70 includes the piston rod 71 and a housing 72, and the piston rod 71 of the shock absorber includes a first rod portion 711 and a second rod portion 712. A diameter of the first rod portion 711 is smaller than a diameter of the second rod portion 712.

A diameter of the through hole of the connecting piece 134 is larger than a diameter of the first rod portion 711 but smaller than a diameter of the second rod portion 712, so that the connecting piece 134 can limit the upward stroke of the piston rod 71 of the shock absorber, and make the piston rod 71 of the shock absorber swing around a center of the connecting piece 134 when it is subjected to a biasing force. Note that the center of the connecting piece 134 is also a rotation center of the piston rod 71 of the shock absorber as point A. Since the first boss 121 makes the upper surface of the upper cover be a non-planar surface, a distance H1 from the rotation center A to the top surface of the buffer block 50 is reduced.

The connecting piece 134 is provided between an upper part and a lower part of the shock-absorbing rubber 131. Therefore, the damping force F1 of the shock absorber 70 reaches the vehicle body 90 through the connecting piece 134, the damping rubber 131 and the upper cover 12 in sequence, that is, the transmission path of the damping force F1 of the shock absorber 70 also does not pass through the bearing 20. The transmission path of the force F1 is shown as the first channel I in FIG. 1.

In the embodiment of the present disclosure, the first recess portion 13 is provided with a bushing, the bushing is arranged coaxially with the first recess portion 13, and the size of the bushing is slightly smaller than that of the vertical portion 133 of the first recess portion 13, and the bushing is in clearance fit with the vertical portion 133. The shock-absorbing rubber 131 is connected to the bushing, an upper end of the shock-absorbing rubber 131 is in contact with the upper cover 12, and a lower end of the shock-absorbing rubber 131 is in contact with the bottom of the first recess portion 13.

A first buffer device 30 is provided between the bearing 20 and the spring 40, and the first buffer device 30 is arranged coaxially with the bearing 20. Therefore, the force F2 exerted on the spring 40 reaches the vehicle body 90 through the first buffer device 30, the bearing 20, the first recess portion 13 of the upper support of the shock absorber and the upper cover 12 in sequence, and the transmission of the force F2 is shown as the second channel II in FIG. 1. The first buffer device 30 can protect the bearing 20, improve the service life of the bearing 20, and avoid abnormal noise caused by the collision between the bearing 20 and the spring 40. An upper surface of the first buffer device 30 is connected to the bearing 20, and a lower surface of the first buffer device 30 is connected to the spring 40.

Figure 8:
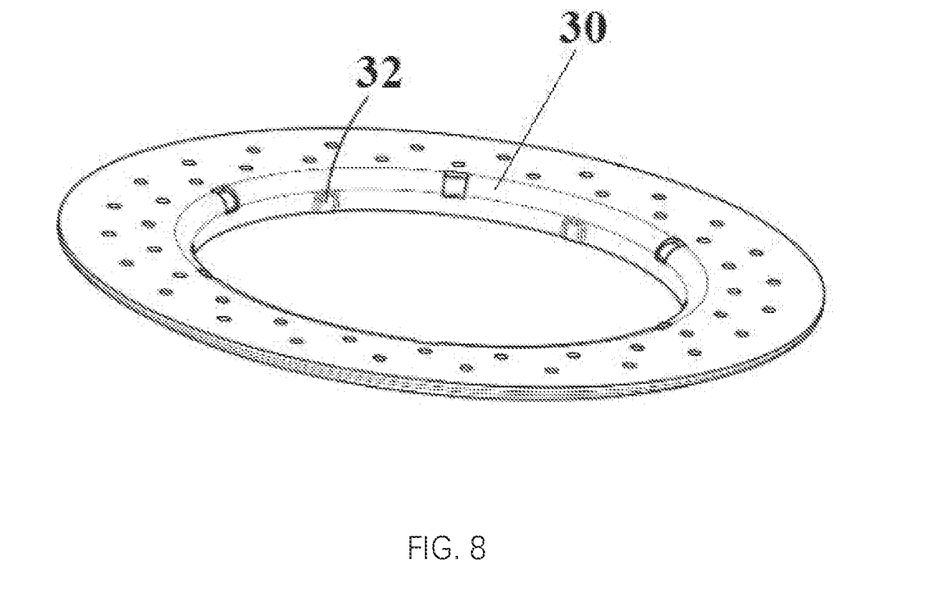
FIG. 8 is a schematic structural view of the first buffer device.
Figure 9:
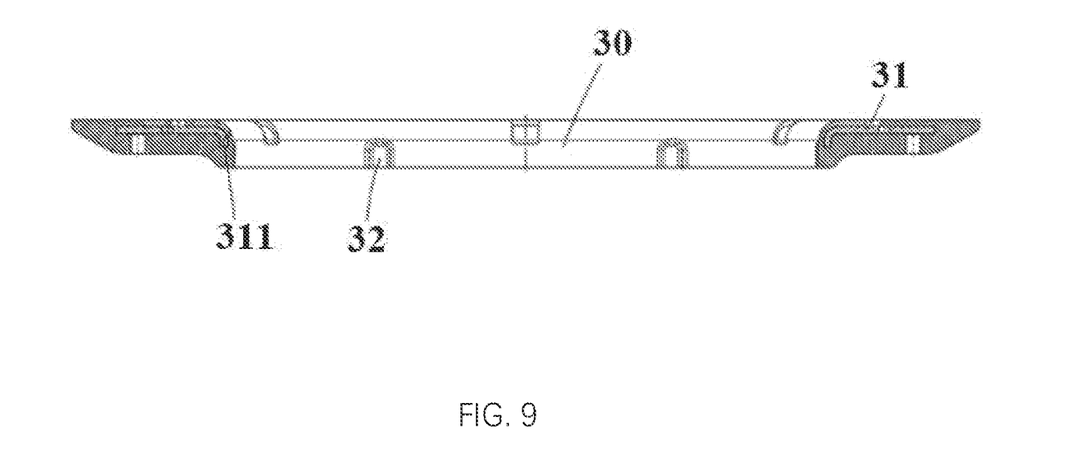
FIG. 9 is a cross-sectional view of the first buffer device.

As shown in FIG. 8 and FIG. 9, a support frame 31 is provided inside the first buffer device 30, and the support frame 31 can improve the structural strength of the first buffer device 30. The first buffer device 30 and the support frame 31 are both annular structures. The support frame 31 includes a horizontal portion and a bent portion 311. The horizontal portion and the bent portion 311 are integrated into one single piece. The bent portion 311 is disposed at an inner ring edge of the support frame 31, the bent portion 311 has a smooth surface, and the bent portion 311 can prevent an end of the support frame 31 from piercing through the first buffer device 30, which is beneficial to improve the service life of the first buffer device 30 and avoid damage to the piston rod 71 of the shock absorber disposed inside the first buffer device 30 after the support frame 31 pierces through the first buffer device.

A plurality of first convex ribs 32 are arranged on an inner side wall of the first buffer device 30. The plurality of first convex ribs 32 are evenly distributed, and the first convex ribs 32 are used for interference connection with the bearing 20.

Preferably, the size of the first buffer device 30 can make the first buffer device 30 cover a contact area between the spring 10 and the bearing 20.

Figure 7:
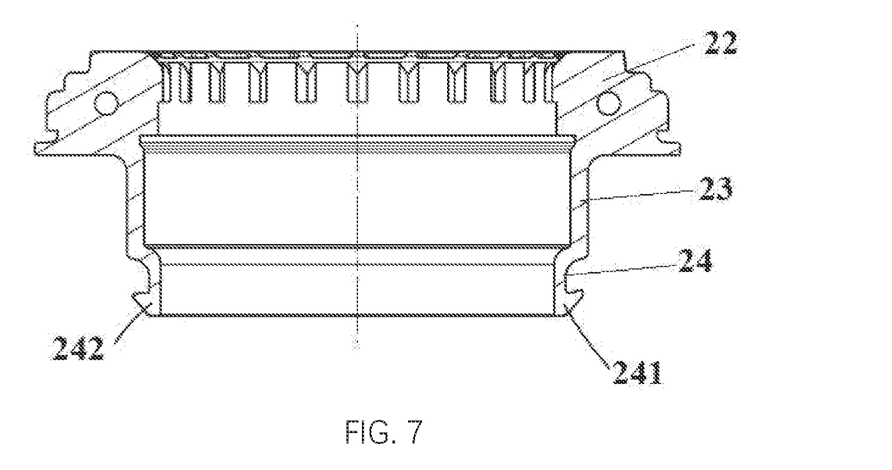
FIG. 7 is a cross-sectional view of the bearing.

As shown in FIG. 6 and FIG. 7, in the strut assembly provided in the embodiment of the present disclosure, the bearing 20 is in cylindrical shape, and the bearing 20 includes a first part 22, a second part 23 and a third part 24 connected in sequence. The second through hole 21 penetrates through the first part 22, the second part 23 and the third part 24. An upper surface of the first buffer device 30 contacts with a bottom surface of the first part 22, and the first convex rib 32 is in an interference fit with the second part 23, so that the firmness of the assembly of the first buffer device 30 can be improved.

An upper surface of the first part 22 is provided with a second boss 221, the bearing 20 is connected with the upper support 10 of the shock absorber through the second boss 221, and the second boss 221 is connected to the upper support 10 of the shock absorber in a small contact surface, which is beneficial to reduce or avoid the abnormal sound caused by the collision between the bearing 20 and the upper support 10 of the shock absorber.

Preferably, the second boss 221 includes a first convex ring 2211 and a second convex ring 2212, an inner diameter of the first convex ring 2211 is larger than an inner diameter of the second convex ring 2212, the first convex ring and the second convex ring are concentric rings.

The second boss 221 further includes a plurality of reinforcing vertical ribs 2213, the reinforcing vertical ribs 2213 connect the first convex ring 2211 with the second convex ring 2212, and the reinforcing vertical ribs 2213 are evenly distributed along the circumferential direction.

The first convex ring, the second convex ring and the reinforcing vertical ribs form a plurality of "H"-shaped supporting structures with strong supporting capability. The bearing 20 is in contact with the flange 132 of the first recess portion of the upper support 10 of the shock absorber through the "H"-shaped support structure. Compared with the large-surface contact method adopted in the prior art, it can reduce the abnormal contact noise between the bearing 20 and the upper support 10 of the shock absorber.

A second convex rib 2214 is provided from the reinforcing vertical rib 2213 toward the center of the bearing 20, the second convex rib 2214 is arranged, at an inner side wall of the first part, and the second convex rib 2214 forms a line-to-surface contact with the piston rod 71 of the shock absorber inserted into the bearing 20. Compared with the surface-to-surface contact method used in the prior art, it can reduce or even avoid the damage to the bearing caused by the collision between the shock absorber piston rod 71 and the bearing 20, and further avoid abnormal noise caused by the collision, and improve the NVH (Noise, Vibration, Harshness, Noise, Vibration and Harshness) performance of the vehicle.

A hook is provided at an outer edge of a bottom of the third part 24.

The strut assembly provided in the embodiment of the present disclosure further includes a dust cover 60, and the dust cover 60 is sleeved outside the buffer block 50. Specifically, one end of the dust cover 60 is connected to the bearing 20 through the hook, and the other end of the dust cover 60 is arranged to be connected with the housing 72 of the shock absorber 70, so that the dust cover 60 can shield the exposed part of the piston rod 71 of the shock absorber and the buffer block 50, serves to prevent impurities such as dust, sediment and the like from entering the inside of the strut assembly.

As shown in FIG. 7, the hooks include barb hooks 241 and horizontal hooks 242. The barb hook 241 form an included angle with the outer side wall of the bearing 20, and the included angle is an acute angle. The barb hooks 241 can increase the clamping force on the dust cover 60, so that the dust cover 60 is not easy to fall off, and the horizontal hook 242 can facilitate the assembly and replacement of the dust cover 60.

Optionally, the barb hooks 241 and the horizontal hooks 242 are symmetrically distributed around the outer wall of the bearing 20.

A plurality of the barb hooks 241 and the horizontal hooks 242 can be provided.

That is, as shown in FIG. 2, an embodiment of the present disclosure provides a strut assembly, wherein the height of the lowest portion of the upper support 10 of the shock absorber is lower than the height of the lowest portion of the bearing 20, and a height difference between the lowest portion of the bearing 20 and the lowest portion of the upper support 10 of the shock absorber is H. An outer diameter of the lowest portion of the upper support 10 of the shock absorber is smaller than an outer diameter of the lowest portion of the bearing 20, and a radial width difference between the lowest portion of the bearing 20 and the lowest portion of the upper support 10 of the shock absorber is L.

When the vehicle passes through the undulating road surface and the wheels are at the upper limit of vertical motion, the shock absorber 70 presses the buffer block 50 upwardly. If the buffer block 50 is compressed to the limit position (as shown in FIG. 2), the housing 72 of the shock absorber can only touch the bottom of the upper support 10 of the shock absorber because there is a height difference H between the bearing 20 and the upper support 10 of the shock absorber. Therefore, under the limit state, the housing 72 of the shock absorber can only touch the upper support 10 of the shock absorber, but cannot touch the bearing 20, and the bearing 20 will not be damaged under a strong impact, so that the bearing 20 is protected.

When the vehicle is cornering, the change in the direction of the wheel will exert a torque on the strut assembly, causing the piston rod 71 of the shock absorber to change its angle about its rotation center A (as shown in FIG. 3). When the piston rod 71 of the shock absorber rotates, if the buffer block 50 is compressed and deformed to the limit position, due to the radial width difference L, the buffer block 50 will not collide with the bearing 20 and cause damage to it.

Meanwhile, since the distance H1 from the rotation center A to the top surface of the buffer block 50 is reduced, the swing range of the piston rod 71 of the shock absorber is greatly restricted when it rotates, so that the amount of interference between the piston rod 71 of the shock absorber and the buffer block 50 is reduced, the abnormal noise is reduced and the hard damage to the buffer block 50 is reduced as well.

The spring 40 is a coil spring, and the side Where the spring 40 meets the bearing is provided with a horizontal portion (i.e., as shown in FIG. 1, the spring 40 is in the same horizontal planar at a contact portion with the first buffer device 30) to avoid local contact between the spring 40 and the bearing 20, so that the force on the spring 40 can be evenly transmitted to the bearing 20 through the first buffer device 30, and the bearing 20 will not be broken due to uneven force. Accordingly, the bearing 20 is symmetrically arranged at the position contact with the first part 22, which can also reduce the difficulty of producing and manufacturing the bearing 20.

The strut assembly provided in the embodiment of the present disclosure further includes a spring support bracket, the spring support bracket is arranged at an outer side wall of the housing of the shock absorber 70, and an end of the spring 40 away from the bearing 20 is connected to the spring support frame through a second buffer device 80.

The strut assembly provided in the present disclosure can transmit the impact load of the road surface to the vehicle body through three channels, namely:

The first channel I: the damping force F1 of the shock absorber 70 reaches the vehicle body through the connecting piece 134, the shock-absorbing rubber 131 and the upper cover 12 in sequence;

The second channel II: the force F2 exerted on the spring 40 reaches the vehicle body 90 through the first buffer device 30, the bearing 20, the first recess portion 13 of the upper support of the shock absorber and the upper cover 12 in sequence;

The third channel III: the force F3 exerted on the buffer block 50 reaches the vehicle body 90 through the second recess portion 13, the vertical portion 133 and the upper cover 12 in sequence;

The first channel I and the third channel III do not pass through the bearing, and the force F3 exerted on the buffer block is relatively large (about 43 KN), so the bearing will not be damaged due to the excessive load, and the bearing 20 does not need to be made of high-performance materials, which helps to reduce costs.

In the strut assembly provided in the embodiment of the present disclosure, there is a height difference H between the bearing 20 and the upper support 10 of the shock absorber, so that the housing 72 of the shock absorber only touches the upper support 10 of the shock absorber at the extreme position of the upward movement, but cannot touch the bearing 20, so that the bearing 20 will not be damaged under a strong impact, thus realizing the protection of the bearing 20.

Meanwhile, there is a radial width difference L between the lowest portion of the bearing 20 and the lowest portion of the upper support 10 of the shock absorber. Therefore, when the buffer block 50 is compressed to the limit position with the rotation of the piston rod 71 of the shock absorber, the buffer block 50 will not collide with the bearing 20 and cause damage to it.

The first boss is provided at the contact position between the upper support 10 of the shock absorber and the vehicle body, and the first boss forms a small surface contact with the vehicle body, which can prevent the upper support of the shock absorber from colliding with the vehicle body and producing abnormal noise. The first boss 121 can be formed by stamping, and the cost is low as compared with the method of the prior art by arranging a vulcanized rubber layer for the contact between the upper support of the shock absorber and the vehicle body.

The first buffer device 30 is arranged between the bearing 20 and the spring 40. The first buffer device 30 can protect the bearing 20, improve the service life of the bearing 20, and avoid the abnormal sound caused by the collision between the bearing 20 and the spring 40.

The second boss 221 is provided at the contact position between the bearing and the upper support of the shock absorber, and the second boss forms a small surface contact with the upper support 10 of the shock absorber, which is beneficial to reduce or avoid the abnormal sound caused by the collision between the bearing 20 and the upper support 10 of the shock absorber.

The first boss 121 reduces the distance H1 from the rotation center A to the top surface of the buffer block 50, so that the swing amplitude of the piston rod 71 of the shock absorber about the rotation center A is reduced, and the amount of interference between the piston rod 71 of the shock absorber and the buffer blocks 50 is reduced, accordingly, the abnormal noise is reduced, and the hard damage to the buffer blocks 50 is reduced as well.

The load of the spring 40 can be evenly distributed on the bearing 20, and the bearing 20 will not be broken due to uneven force.

Embodiment 2

Referring to FIGS. 1 to 11, an embodiment of the present disclosure provides a vehicle, which includes a vehicle body 90, a wheel hub and the strut assembly described in Embodiment 1. The strut assembly is connected with the vehicle body 90 through the first boss 121 of the upper support 10 of the shock absorber, and the strut assembly is connected with the wheel hub through the piston rod 71 of the shock absorber.

The above descriptions are only preferred embodiments of the present disclosure, and are not intended to limit the present disclosure. For those skilled in the art, it is obvious that the present disclosure is not limited to the details of the above-mentioned exemplary embodiments, and the present disclosure can be implemented in other specific forms without departing from the spirit or essential features of the present disclosure. Therefore, the embodiments are to be regarded in all respects as illustrative and not restrictive, and the scope of the invention is to be defined by the appended claims rather than the foregoing description. It is therefore intended to embrace all changes fallen within the meaning and scope of the equivalents in the scope of the claims of in the present disclosure. Any reference signs in the claims shall not be construed as limiting the involved claim.

What is claimed is:

1. A strut assembly, comprising a piston rod of a shock absorber, an upper support of the shock absorber, a bearing, a spring and a buffer block, which are coaxially arranged;
   the upper support of the shock absorber being provided with a first through hole, the bearing being provided with a second through hole, and a portion of the upper support of the shock absorber being arranged in the second through hole, the buffer block being provided with a third through hole, and one end of the piston rod of the shock absorber being located in the first through hole, the other end of the piston rod-of the shock absorber passing through the third through hole, the buffer block being connected with the upper support of the shock absorber, the spring being sleeved around the piston rod of the shock absorber, and the spring being connected with the bearing;
   wherein the upper support of the shock absorber comprises an upper cover at a top portion thereof, the upper cover is provided with a plurality of first bosses around the first through hole, the first bosses axially protrude from an upper surface of the upper cover with the first bosses being higher than other parts of the upper cover, and the first bosses are provided with a plurality of mounting holes configured for connecting the upper support of the shock absorber to a vehicle body;
   wherein a first buffer device is arranged between the bearing and the spring, and the first buffer device is coaxially arranged with the bearing, a support frame is provided inside the first buffer device configured for improving a strength of the first buffer device; and
   a plurality of first convex ribs are arranged on an inner side wall of the first buffer device, configured for contacting with the bearing.

2. The strut assembly according to claim 1, wherein the upper support of the shock absorber comprises a first recess portion and a second recess portion connected in sequence, the first through hole penetrates the upper cover, the first recess portion and the second recess portion, the buffer block and the second recess portion are connected, the upper cover is blocked outside the second through hole, the first recess portion is located in the second through hole, the second recess portion partially protrudes out the second through hole.

3. The strut assembly according to claim 2, wherein the second recess portion is provided with a clamping portion, and the buffer block is provided with a groove, the clamping portion cooperates with the groove to connect the upper support of the shock absorber with the buffer block.

4. The strut assembly according to claim 2, wherein a shock-absorbing rubber and a connecting piece are further provided between the first recess portion and the upper cover, the connecting piece is arranged on an outer circumference of the piston rod of the shock absorber, and the connecting piece is located between an upper portion and a lower portion of the shock-absorbing rubber.

5. The strut assembly according to claim 4, wherein the piston rod comprises a first rod portion and a second rod portion, a diameter of the first rod portion is smaller than a diameter of the second rod portion, a diameter of a through hole of the connecting piece is larger than a diameter of the first rod portion but smaller than a diameter of the second rod portion, an upper end of the piston rod is lower than a lower surface of a corresponding portion of the upper cover, and the piston rod is swingable around a center of the connecting piece.

6. The strut assembly according to claim 1, wherein a second boss is provided on a side of the bearing, the bearing is connected with the upper support of the shock absorber through the second boss.

7. The strut assembly according to claim 6, wherein the second boss comprises a first convex ring, a second convex ring, and a plurality of reinforcing vertical ribs, an inner diameter of the first convex ring is larger than an inner diameter of the second convex ring, the reinforcing vertical ribs connect the first convex ring with the second convex ring, a plurality of second convex ribs are provided from the reinforcing vertical ribs toward a center of the bearing, and the second convex ribs are arranged at an inner side wall of the bearing.

8. The strut assembly according to claim 1, wherein a height of the lowest portion of the upper support of the shock absorber is tower than a height of the lowest portion of the bearing, an outer diameter of the lowest portion of the upper support of the shock absorber is smaller than an outer diameter of the lowest portion of the bearing.

9. The strut assembly according to claim 1, wherein the spring is a coil spring, and a side of the spring close to the bearing is provided with a horizontal portion.

10. The strut assembly according to claim 1, wherein the support frame comprises a horizontal portion and a bent portion connected with the horizontal portion, the horizontal portion is disposed at an upper top edge of the first buffer device, the bent portion is disposed at an inner ring edge of the first buffer device, and the bent portion has an arc smooth surface.

11. The strut assembly according to claim 10, wherein the horizontal portion and the bent portion are integrated into one single piece.

12. The strut assembly according to claim 1, wherein the bearing comprises a first part, a second part and a third part, the first part is disposed at an upper portion of the bearing, the third part is disposed at a lower portion of the bearing, the second part is connected between the first part and the third part, and a plurality of hooks are provided at an outer edge of the third part, configured for connecting with a dust cover of the shock absorber.

13. The strut assembly according to claim 12, wherein the hooks comprises barb hooks and horizontal hooks, each of the barb hooks forms an included angle with an outer side wall of the bearing, and the included angle is an acute angle, each of the horizontal hooks has a plane surface on a top end thereof.

14. A vehicle, comprising a vehicle body, a wheel hub and a strut assembly, the strut assembly comprising a piston rod of a shock absorber, an upper support of the shock absorber, a bearing, a spring and a buffer block, which are coaxially arranged;

the upper support of the shock absorber being provided with a first through hole, the bearing being provided with a second through hole, and a portion of the upper support of the shock absorber being arranged in the second through hole, the buffer block being provided with a third through hole, and one end of the piston rod of the shock absorber being located in the first through hole, the other end of the piston rod-of the shock absorber passing through the third through hole, the buffer block being connected with the upper support of the shock absorber, the spring being sleeved around the piston rod of the shock absorber, and the spring being connected with the bearing;

the upper support of the shock absorber comprising an upper cover at a top portion thereof, the upper cover being provided with a plurality of first bosses around the first through hole, the first bosses axially protruding from an upper surface of the upper cover with the first bosses being higher than other parts of the upper cover;

the strut assembly being connected with the vehicle body through the first bosses of the upper support of the shock absorber, and the strut assembly being connected with the wheel hub through the piston rod of the shock absorber; and wherein the bearing comprises a first part, a second part and a third part, the first part is disposed at an upper portion of the bearing, the third part is disposed at a lower portion of the bearing, the second part is connected between the first part and the third part, and a plurality of hooks are provided at an outer edge of the third part, configured for connecting with a dust cover of the shock absorber.

15. The vehicle according to claim 14, wherein a first buffer device is arranged between the bearing and the spring, and the first buffer device is coaxially arranged with the bearing, a support frame is provided inside the first buffer device, configured for improving a strength of the first buffer device, the support frame comprises a horizontal portion and a bent portion connected with the horizontal portion, the horizontal portion is disposed at an upper top edge of the first buffer device, the bent portion is disposed at an inner ring edge of the first buffer device, and the bent portion has an arc smooth surface.

16. The vehicle according to claim 14, wherein a connecting piece is provided in the upper support of the shock absorber, the piston rod comprises a first rod portion and a second rod portion, a diameter of the first rod portion is smaller than a diameter of the second rod portion, a diameter of a through hole of the connecting piece is larger than a diameter of the first rod portion but smaller than a diameter of the second rod portion, an upper end of the piston rod is lower than a lower surface of a corresponding portion of the upper cover, and the piston rod is swingable around a center of the connecting piece.

* * * * *